United States Patent [19]

Ohno et al.

[11] Patent Number: 5,187,757
[45] Date of Patent: Feb. 16, 1993

[54] FIBER OPTIC GYRO

[75] Inventors: Aritaka Ohno; Shinji Motohara; Kazuo Hotate, all of Tokyo, Japan

[73] Assignee: Japan Aviation Electronics Industry Limited, Tokyo, Japan

[21] Appl. No.: 897,748

[22] Filed: Jun. 12, 1992

[30] Foreign Application Priority Data

Jun. 28, 1991 [JP] Japan .................................. 3-158768
Aug. 2, 1991 [JP] Japan .................................. 3-194050
Dec. 3, 1991 [JP] Japan .................................. 3-319114

[51] Int. Cl.5 ............................................. G02B 5/30
[52] U.S. Cl. ...................................... 385/11; 356/350
[58] Field of Search .................. 385/1, 11, 13, 14, 12; 356/350

[56] References Cited

U.S. PATENT DOCUMENTS 4,712,306 12/1987 Cahill et al. .................. 356/350 X
5,054,923 12/1991 Okada ............................... 356/350
5,136,667  8/1992 Ohno et al. ......................... 385/11

Primary Examiner—Akm E. Ullah
Attorney, Agent, or Firm—Pollock, Vande Sande and Priddy

[57] ABSTRACT

An optical fiber coil in a fiber optic gyro is formed by a single mode optical fiber and two polarization retaining optical fibers of the same length connected respectively to both ends of the single mode optical fiber. The polarization retaining optical fibers and an optical fiber coupler are connected, and clockwise and counterclockwise light beams are distributed and supplied by the optical fiber coupler to the optical fiber coil, and the two light beams having returned to the optical fiber coupler are thereby caused to interfere with each other. The lengths of the X-axis and Y-axis components of light are displaced apart in phase to such an extent as not to interfere with each other, by the birefringent property induced in the coil of the single optical fiber and the birefringent property of the polarization retaining optical fibers themselves.

7 Claims, 3 Drawing Sheets

FIBER OPTIC GYRO

BACKGROUND OF THE INVENTION

The present invention relates to a fiber optic gyro in which clockwise and counterclockwise light beams are caused to propagate through an optical fiber coil and their phase difference is detected to thereby detect an angular rate applied to the optical fiber coil about the axis thereof.

FIG. 1 shows a conventional fiber optic gyro. Light from a light source 11 passes through an optical fiber coupler or similar optical coupler 12 and enters into a polarizer 13, wherein its component in a predetermined direction of polarization alone is extracted. The light from the polarizer 13 is split by an optical fiber coupler or similar optical coupler 14 into two, one of which is provided as a clockwise beam to one end of a single-mode optical fiber coil 16 via a depolarizer 15 and the other of which is provided as counterclockwise beam to the other end of the optical fiber coil 16 via an optical phase modulator 17. The clockwise and counterclockwise beams, after having propagated through the optical fiber coil 16, return to the optical coupler 14, wherein they are combined to interfere with each other. The resulting interference light is provided to the polarizer 13, wherein its component only in a predetermined direction of polarization is extracted. The light having thus passed through the polarizer 13 is branched by the optical coupler 12 into a photodetector 18 for conversion into an electric signal corresponding to the intensity of the interference light. A periodic function signal from a modulation signal generator 19, for example, a sine-wave signal, is applied to the optical phase modulator 17 to drive it, phase modulating the light passing therethrough. The output of the photodetector 18 is provided to a synchronous detector 21, wherein it is synchronously detected by a reference signal from the modulation signal generator 19, and the detected output is provided to an output terminal 22.

With no angular rate applied to the optical fiber coil 16 about its axis, no phase difference exists between the clockwise and counterclockwise light beams having propagated through the optical fiber coil 16 and the output of the synchronous detector 21 is also zero. When an angular rate is being applied to the optical fiber coil 16 about its axis, the phase difference corresponding to the angular rate is introduced between the clockwise and counterclockwise light beams and the synchronous detector 21 yields at output terminal 22 an output of a polarity and a level corresponding to the direction and magnitude of the applied angular rate, permitting detection of the applied angular rate.

In this way, the fiber optic gyro is to detect the phase difference between the clockwise and counterclockwise light beams. In the case where the depolarizer 15 is not provided, the state of polarization of the input linearly polarized light undergoes a change during propagation through the optical fiber coil 16, producing a component polarized perpendicularly thereto. Since the optical fiber coil 16 is a little birefringent due to its bend on itself, light beams of components polarized perpendicularly to each other propagate through the optical fiber coil 16 at different velocities. Consequently, when the one polarized component of the clockwise light beam and the other polarized component of the counterclockwise light beam, which are combined by the optical coupler 14, interfere with each other, the phase difference between the clockwise and counterclockwise light beams cannot be detected correctly.

To avoid this, it is a general practice in the prior art to provide the depolarizer 15, whereby the one polarized component and the other polarized component perpendicular thereto are made equal in intensity, displaced far apart in phase and rendered uncorrelative or incoherent to each other (that is, non-polarized relative to each other), thereby preventing that the one polarized component of the clockwise light beam and the other polarized component of the counterclockwise light beam interfere with each other.

The depolarizer 15 is usually a LYOT type fiber depolarizer (K. Bohm, et al., IEEE col. LT-1, No. 1, March 1983, p.71, for example). The depolarizer is produced by splicing two constant polarization optical fibers (plane-of-polarization retaining optical fibers, i.e. birefringent optical fibers), with major axes in their diametrical direction held at 45° to each other.

There has also been proposed a fiber optic gyro of the type employing a polarization retaining optical fiber as the optical fiber coil 16, omitting the depolarizer 15. In this instance, the state of polarization of each of the clockwise and counterclockwise light beams, which propagate through the optical fiber coil 16, is held stable, and hence the gyro functions remain stable. The polarization retaining optical fiber has two low-melting-point tension cores disposed along the fiber core on both sides thereof in parallel, adjacent but spaced relation thereto. With a tensile stress applied to the fiber core in the direction of its diameter passing through the two tension cores, the optical fiber develops a birefringent property that its refractive index differs between the above-mentioned direction of the diameter of the fiber core and the direction of its diameter perpendicular thereto. The polarization retaining optical fiber is so expensive that the cost of the optical fiber coil 16 accounts for about 50% of the overall cost of the fiber optic gyro.

In the case of employing the single mode optical fiber as the optical fiber coil 16, the fiber optic gyro is less expensive but its fabrication is time- and labor-consuming because the depolarizer 15 is used in this case. That is, the depolarizer 15 is formed by fusion-splicing two polarization retaining optical fibers, with their principal axes displaced 45° apart, and the accuracy required for the angular deviation between the principal axes is very high. Besides, a quadrapole winding, set forth in SPIE, Vol. 412, pp. 268-271 (1983), is effective in reducing a drift of the fiber optic gyro which is caused by a temperature change or similar external disturbance. With the quadrapole winding, however, it is necessary, for the reduction of the drift, that the influence of the external disturbance be held symmetrical with respect to the center of the optical fiber along the entire length thereof; hence, in the structure wherein the depolarizer is disposed at one end of the coil, the influence of the external disturbance is asymmetrical due to the presence of the depolarizer, resulting in insufficient reduction of the drift.

SUMMARY OF THE INVENTION

It is therefore an object of the present invention to provide a fiber optic gyro which is inexpensive and stable in its detected interference light output.

According to the present invention, the single mode optical fiber is used as the optical fiber coil and polarization retaining means is provided between each end of the optical fiber coil and optical coupler means. The polarization retaining means may preferably be formed by a pair of polarization retaining optical fibers and their lengths are selected sc that X-axis and Y-axis components of light, which is generated over the entire length of the whole structure including the polarization retaining optical fibers and the single mode optical fiber, has such a phase difference that the X-axis component of the clockwise light beam and the Y-axis component of the counterclockwise light beam do not interfere with each other. For example, in the case of using, as the light source, a super luminescent diode of poor coherence, provision is made for providing a phase difference in excess of $10^2$ to $10^3$ rad between the X-axis and Y-axis components, and in the case of employing an inexpensive light source of good coherence, for example, a laser diode, provision is made for providing a phase difference greater than $10^4$ to $10^5$ rad. It is preferable that the polarization retaining optical fibers be equal in length and identical in property.

Also when the single mode optical fiber is used as a coil, that is, when it is bent, in particular, when the diameter of the coil is small, a difference is induced in the propagation constant between the X-axis and Y-axis components of light. Accordingly, the lengths of both polarization retaining optical fibers are chosen such that the X-axis and Y-axis components of light which are generated in the single mode optical fiber in the optical fiber coil are displaced apart in phase so that they do not interfere with each other.

In the above, the polarization retaining optical fiber is a polarization retaining optical fiber in a narrow sense (that is, a constant polarization optical fiber having the aforementioned tension core in its cladding) or an optical fiber having the same birefringent property as that of the former. The latter optical fiber may be an optical fiber which has birefringence in itself, or an optical fiber which is caused to develop such birefringence.

DESCRIPTION OF THE PREFERRED EMBODIMENTS

Figure 1:
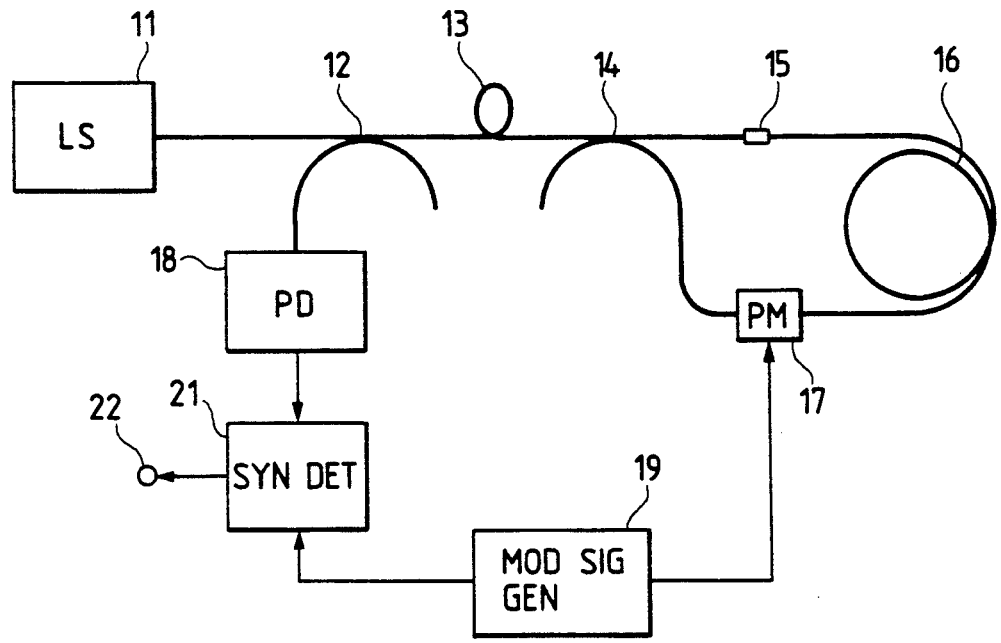
FIG. 1 is a block diagram showing a conventional fiber optic gyro.
Figure 2:
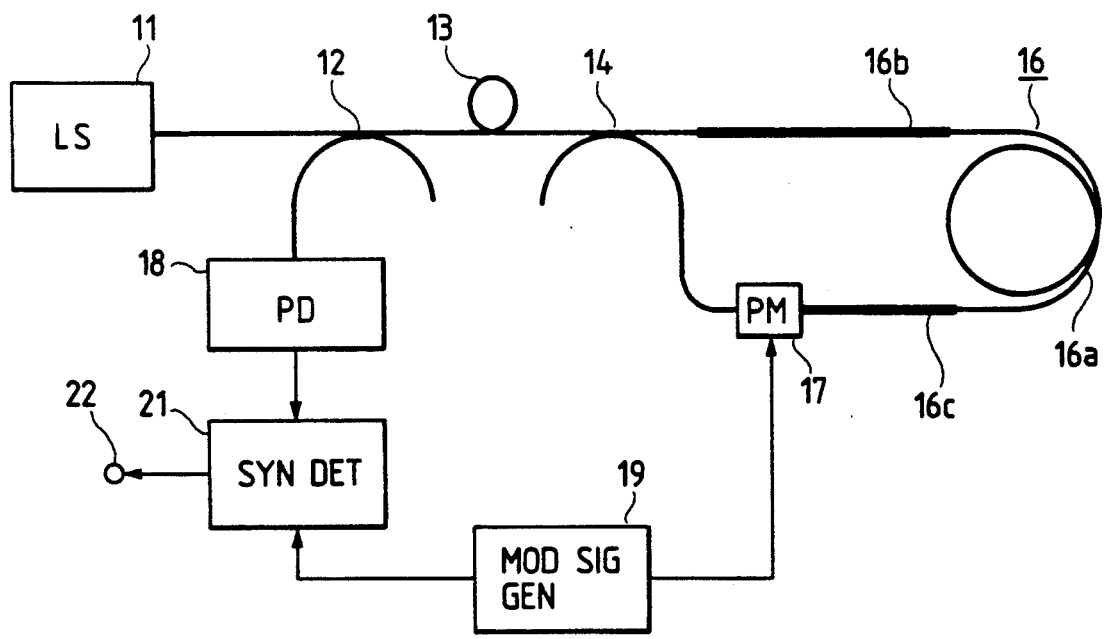
FIG. 2 is a block diagram illustrating a first embodiment of the fiber optic gyro according to the present invention.

FIG. 2 illustrates in block form a first embodiment of the fiber optic gyro according to the present invention, in which the parts corresponding to those in FIG. 1 are identified by the same reference numerals. As is the case with the prior art example of FIG. 1, this embodiment is provided with the light source 11, the optical coupler 12, the polarizer 13, the optical coupler 14, the optical phase modulator 17, the photodetector 18, the modulation signal generator 19 and the synchronous detector 21, and no description will be given of them. In the present invention the optical fiber coil 16 is formed by a single mode optical fiber 16a and polarization retaining optical fibers 17b and 17c each connected to one end of the optical fiber 16a. In this example, the single mode optical fiber 16a is wound into a coil, the optical coupler 14 is formed by an optical fiber coupler, and the polarization retaining optical fibers 16b and 16c are connected between two ports of the optical fiber coupler 14 and the both ends of the single mode optical fiber 16a, respectively. The optical fiber coupler 14 and the both polarization retaining optical fibers 16b and 16c are connected to each other, with the rotational angular positions of the fibers 16b and 16c relative to the coupler 14 so adjusted as to maximize the quantity of polarized light from the propagation path formed by the polarization retaining optical fibers from the polarizer 13 to the photodetector 8.

Since the single mode optical fiber 16a is held in the form of a coil, birefringence B (where $B = (\beta x - \beta y)/k$, k being a constant) is produced. This causes a difference between the propagation constants $\beta x$ and $\beta y$ of the X-axis and Y-axis components of light, performing the same function as the polarization retaining optical fiber. The lengths of the polarization retaining optical fibers 16b and 16c are chosen such that the overall phase difference including the phase difference between the two axes components caused, by the birefringence B and the phase difference (including a sign) which is caused in the polarization retaining optical fiber 16b does not cause interference of the two axes components. The overall phase difference is selected in excess of $10^2$ to $10^3$ rad in the case of using a super luminescent diode of poor coherence as the light source 11 and in excess of $10^4$ to $10^5$ rad in the case of a laser diode of good coherence. The single mode optical fiber 16a and the polarization optical fibers 16b and 16c are spliced together sr that the principal axis of the birefringence resulting from bending of the single mode optical fiber 16a and the principal axis of the birefringence of each cf the optical fibers 16b and 16c are substantially aligned with each other. However, these principal axes need not necessarily be aligned exactly.

Even in the case where it is possible, only with the single mode optical fiber 16a, to provide such a phase difference that the X-axis and Y-axis components do not interfere with each other, the polarization retaining optical fibers 16b and 16c are used as extra length portions or connecting portions (which are substantially straight, and hence are not substantially birefringent) between the single mode optical fiber 16a and the optical coupler 14 with a view to ensuring efficient coupling of such portions to the optical coupler 14 so that the plane of polarization of light does not change in the above-mentioned connecting portions. It is preferable that both polarization retaining optical fibers 16b and 16c be partly wound on the same bobbin together with the single mode optical fiber 16a and spliced together in the state in which birefringence is being developed in the single mode optical fiber 16a. Even if the polarization retaining optical fibers 16b and 16c are connected to both end portions of the coiled single mode optical fiber 16a or above-said extra length portions, the portions where no birefringence is present are short and the polarization retaining optical fibers 16b and 16c need only have such lengths that fluctuations in the direction of polarization in these portions are negligible.

According to the first embodiment of the present invention described above, since the optical fiber coil 16 includes the polarization retaining optical fibers 16b and 16c connected to both ends of the single mode optical fiber 16a, the phase difference between the X-axis and Y-axis components of light, based on the birefringence caused by coiling the single mode optical fiber 16a, can be made large enough to prevent the two components from interference with each other, by the polarization retaining optical fibers 16b and 16c connected to both ends of the optical fiber 16a. Hence, the expensive polarization retaining optical fibers 16b and 16c that are included in the optical fiber coil 16 are small in length, that is, the optical fiber coil 16 is formed mostly by the inexpensive single mode optical fiber 16a. Thus, the fiber optic gyro can be fabricated at a low cost.

In addition, since the optical fiber coil 16 is coupled with the optical coupler 14 via the polarization retaining optical fibers 16b and 16c, the coupling can be achieved most efficiently. Incidentally, also when substantially no birefringence is caused in the single mode optical fiber 16a forming the optical fiber coil 16, the polarization retaining optical fibers 16b and 16c connected to both ends of the optical fiber 16a need only be long enough to provide such a phase difference that the X-axis and Y-axis components do not interfere with each other. Accordingly, the quantity of polarization retaining optical fiber used in this case is far smaller than in the case of forming the optical fiber coil 16 by the polarization retaining optical fiber alone. Moreover, since the polarization retaining optical fibers are partly wound together with the optical fiber coil 16 at both ends thereof, the plane of polarization of light is very stable and the intensity of light is also stable. Besides, since the optical fiber coil 16 has a symmetrical structure unlike the case where the depolarizer 15 is provided at one end of the optical fiber coil 16, a drift due to a temperature change can be minimized.

Since the FIG. 2 embodiment utilizes the birefringence that is caused by a bending stress in the single mode optical fiber 16a, the birefringence is liable to vary under the influence of a thermal stress which is generated by the difference in thermal expansion between the coil bobbin and the single mode optical fiber 16a —this incurs a change in the polarization retaining property of the optical fiber coil 16. That is, the polarization retaining axis varies, and consequently, the quantity of interference light which reaches the photodetector 18 varies. Hence, the output of the fiber optic gyro readily varies with a temperature change, in particular. Next, a description will be given of another embodiment of the present invention improved in this point.

Figure 3:
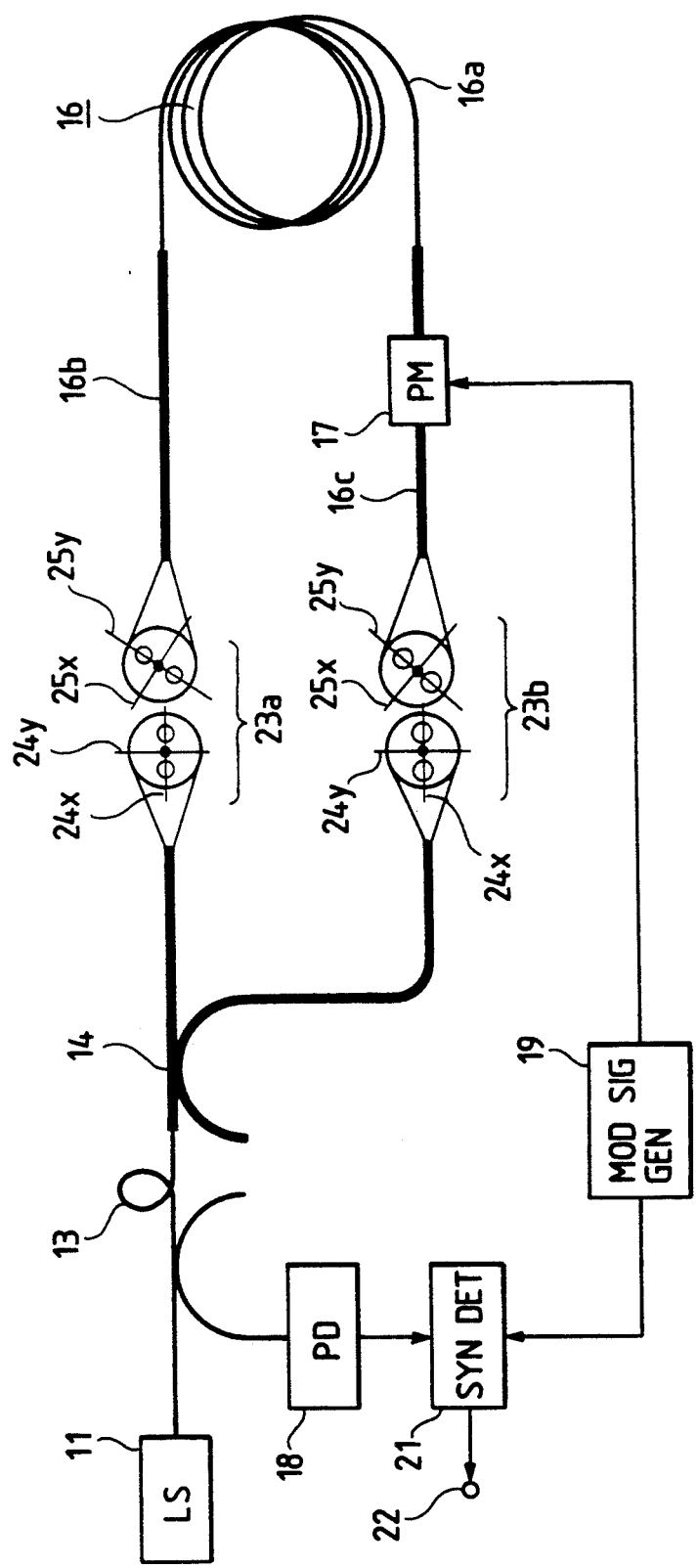
FIG. 3 is a block diagram illustrating a second embodiment of the invention.

FIG. 3 illustrates the principal part of a second embodiment of the fiber optic gyro according to the present invention, in which the parts corresponding to those in FIG. 2 are identified by the same reference numerals. The light source 11, the optical phase modulator 17, the photodetector 18, the modulation signal generator 19 and the synchronous detector 21 are the same as those used in the FIG. 2 embodiment, and hence no description will be given of them. As in the case of the first embodiment, the optical fiber coil 16 is formed by the single mode optical fiber 16a and the two polarization retaining optical fibers 16b and 16c connected to both ends of the optical fiber 16a. This embodiment is shown to employ, as the optical coupler 14, a polarization retaining optical fiber coupler (produced by fusing together and elongating two polarization retaining optical fibers). In FIG. 3 there are shown on an enlarged scale the end faces of the polarization retaining optical fiber coupler 14 and the two polarization retaining optical fibers 16b and 16c at their connection points 23a and 23b. As shown, perpendicularly intersecting polarization retaining axes 24x (the X-axis) and 24y (the Y-axis) in the end face of the polarization retaining optical fiber coupler 14 and perpendicularly intersecting polarization retaining axes 25x (the X-axis) and 25y (the Y-axis) in the end faces of the two polarization retaining optical fibers 16b and 16c are displaced around 45° about their axes.

With such a structure, light which reaches the connection point 23a or 23b from the polarizer 13 via the polarization retaining optical fiber coupler 14 is linearly polarized light having propagated on either one of the polarization retaining axes 24x or 24y of the optical fiber coupler 14, and at the connection point 23 the linearly polarized light enters into the two polarization retaining optical fibers 16b and 16c at an angle of 45° to their polarization retaining axes 25x (the X-axis). As the result of this, the linearly polarized light is split into two components of the same intensity, which propagate through the polarization retaining optical fibers 16b and 16c along the two perpendicularly intersecting polarization retaining axes 25x and 25y, respectively. In other words, linearly polarized light beams of the same intensity and parallel to the polarization retaining axes 25x and 25y enter into the polarization retaining optical fibers 16b and 16c. These light beams pass through the optical fiber coil 16 and return to the polarizer 13 via the optical fiber coupler 14. In this instance, even if the birefringent property of the single mode optical fiber 16a varies due to a change of the thermal stress and its polarization retaining axes change (or turn) accordingly, either one of the two components increases or decreases and the other decreases or increases correspondingly; hence, the sum of their power is always constant. Thus, the intensity of light that reaches the photodetector 18 remains constant, thus providing a stable gyro output.

Usually, the optical fibers are fusion-spliced at the connection points 23a and 23b, but they may also be coupled by means of lenses, for instance. The optical coupler means 14 may also be in the form of an optical integrated circuit.

In this embodiment, linearly polarized light needs only enter into the two polarization retaining optical fibers 16b and 16c so that its components parallel to the two polarization retaining axes 25x and 25y may be of the same intensity. It is therefore possible to employ a structure wherein the polarizer 13 and the optical coupler 14are connected to each other, with the polarization retaining axis in the input/output end of the polarizer 13 and the polarization retaining axis in the input-/output end of the optical coupler 14 inclined at an angle of 45° to each other. In this instance, the optical coupler 14 and the polarization retaining optical fibers 16b and 16c at the connection points 23a and 23b may be connected, with their polarization retaining axes held at arbitrary angles.

In the above embodiments the polarizer 13 is interposed between the optical couplers 12 and 14, but the polarizer 13 has a wavelength dependence; namely, if the wavelength of the light source 11 varies with a temperature change, for example, the polarizer 13 allows the passage therethrough of not only one polarization component but also the other polarization component, causing an error or lowering the accuracy of the gyro output. Next, a description will be given of another embodiment of the invention improved in this respect.

Figure 4:
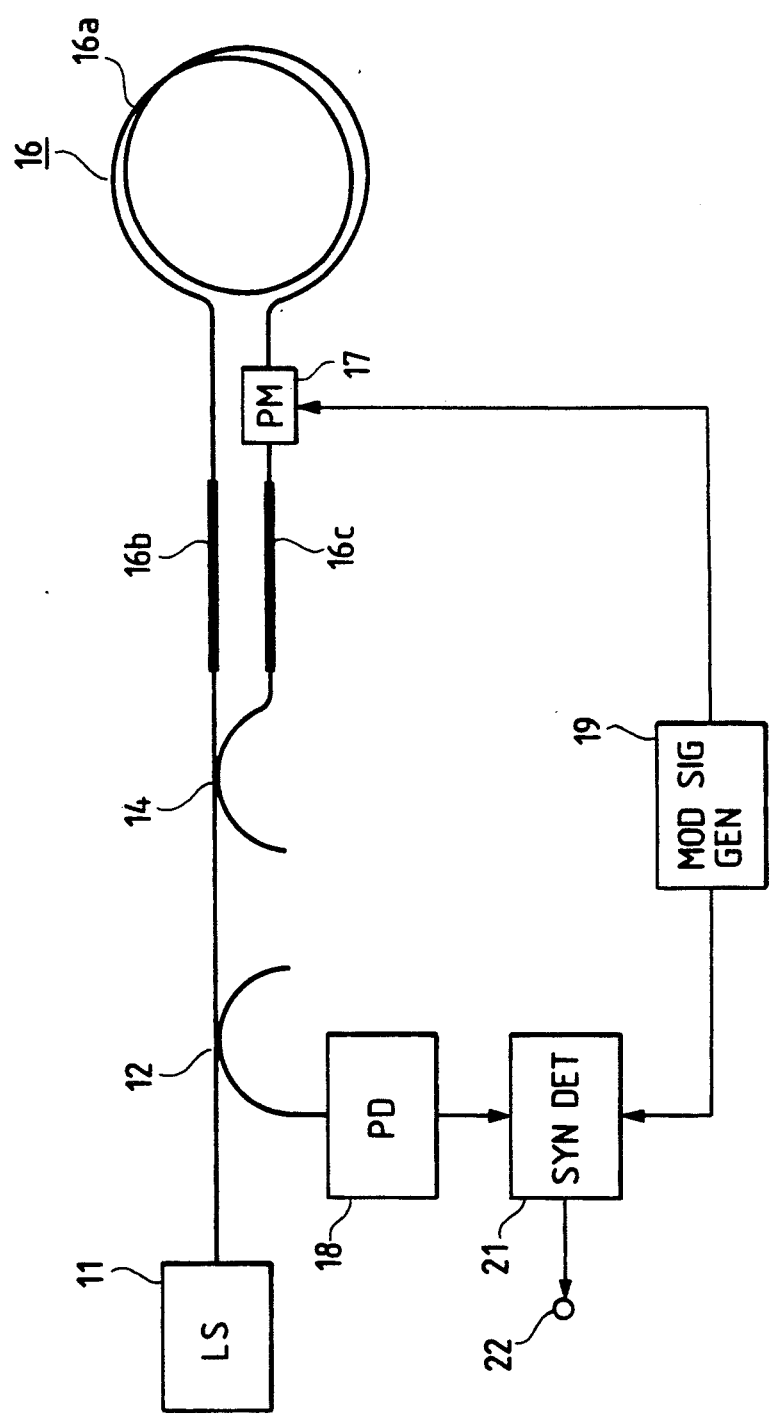
FIG. 4 is a block diagram illustrating a third embodiment of the invention.

FIG. 4 illustrates a third embodiment of the present invention, in which the parts corresponding to those in FIG. 2 are identified by the same reference numerals. Since the light source 11, the optical phase modulator 17, the photodetector 18, the modulation signal generator 19 and the synchronous detector 21 are the same as those employed in the FIG. 2 embodiment, no description will be given of them. In this embodiment, the first and second optical coupler means 12, 14 are directly connected and the optical fiber coil 16 is formed by connecting short polarization retaining optical fibers 16b, 16c to both ends of the single mode optical fiber coil 16a. The lengths of the two polarization retaining optical fibers are chosen such that the phase difference between crosspolarized components is large enough to prevent them from interfering with each other. That is, in this embodiment the optical couplers 12 and 14 are directly coupled, with no polarizer interposed therebetween. In this example the two optical couplers 12 and 14 are constructed as single mode optical couplers, which are directly coupled at one port. Moreover, the optical fiber coil 16 is formed by the single mode optical fiber coil 16a and the short polarization retaining optical fibers 16b and 16c connected to both ends of the coil 16a, and the lengths of the optical fibers 16b and 16c are selected as short as possible within a range wherein the phase difference between the cross-polarized components is large enough to prevent their interference. It is preferable that the two polarization retaining optical fibers 16b and 16c have the same length.

With such an arrangement, cross-polarized components of light which propagate through the optical fiber coil 16 in the same direction are caused by the polarization retaining optical fibers 16b and 16c not to interfere with each other, so that the presence of both polarized components will not induce any error. In particular, the single mode optical fiber coil 16a is birefringent owing to its winding into the coil form, and hence has a property close to that of the polarization retaining optical fibers. In combination with the polarization retaining optical fibers 16b and 16c, the optical fiber coil 16a can provide a phase difference which prevents the cross-polarized components from interference with each other. This reduces the lengths of the optical fibers 16b and 16c.

As described above, according to the first embodiment of the present invention, the optical fiber coil 16 is formed by a single mode optical fiber coil and two polarization retaining optical fibers, and hence can be obtained at a low cost. Further, since two linearly polarized light components of the same intensity are caused to enter into the polarization retaining optical fibers in parallel to their two polarization retaining axes, a stable gyro output can be obtained, even if the birefringent property of the single mode optical fiber 16a varies with a temperature change.

According to the second embodiment of the present invention, light incident to the optical fiber coil propagates therethrough as two components parallel to two perpendicularly intersecting polarization retaining axes of the polarization retaining optical fiber and having substantially the same intensity. Even if the birefringence in the single mode optical fiber varies and the direction of its polarization retaining axis varies accordingly, the sum of those components of the two perpendicular components which pass through the polarizer is always constant because if either one of them decreases, the other increases; hence the intensity of the interference light does not vary.

According to the third embodiment of the present invention, since no polarizer is used, even if the wavelength of the light source 11 varies, there will not be induced an error under the influence of the wavelength independence of the polarizer. Moreover, since neither of the polarizer and the depolarizer is employed and since the polarization retaining optical fibers 16b and 16c are short, the fiber optic gyro can be fabricated at a low cost as a whole. Besides, the optical fiber coil 16 has a symmetrical structure, and hence is not readily affected by a temperature change or mechanical vibration. A low or medium precision fiber optic gyro, for example, 10° to 20° /h, can be implemented at a low cost.

While in the above the present invention has been described as being applied to an open-loop fiber optic gyro, the invention is applicable to a closed-loop fiber optic gyro as well. The optical couplers 12 and 14 may also be formed by optical integrated circuits. The phase modulator 17 may be disposed between the polarization retaining optical fiber 16c and the single mode optical fiber 16a, between the optical coupler 14 and the polarization retaining optical fiber coupler 16c, or at the intermediate portion of the polarization retaining optical fiber 16c.

It will be apparent that many modifications and variations may be effected without departing from the scope of the novel concepts of the present invention.

What is claimed is:

1. A fiber optic gyro wherein light from a light source is split by optical coupling means into two light beams, said light beams being provided as clockwise and counterclockwise light beams to both ends of an optical fiber coil, said clockwise and counterclockwise light beams having propagated through said optical fiber coil are caused by said optical coupling means to interfere with each other, the intensity of said interference light is converted by a photodetector to an electric signal, and an angular rate applied to said optical fiber coil about its axis is detected from said electric signal, characterized in that said optical fiber coil includes a single mode optical fiber and two polarization retaining means connected between both ends of said single mode optical fiber and said optical coupling means, respectively.

2. The fiber optic gyro of claim 1 wherein said two polarization retaining means are two polarization retaining optical fibers.

3. The fiber optic gyro of claim 2 wherein said two polarization retaining optical fibers connected to said both ends of said single mode optical fiber are partly wound together with said optical fiber coil.

4. The fiber optic gyro of claim 1 wherein said two polarization retaining means are connected to said both ends of said optical fiber coil, with polarization retaining axes of the former aligned with polarization retaining axes of said latter which is rendered birefringent by winding it into a coil.

5. The fiber optic gyro of claim 2 wherein said optical fiber coil is formed by a single mode optical fiber and two polarization retaining optical fibers connected to both ends of said single mode optical fiber and said optical coupling means and said two polarization retaining optical fibers having their principal axes displaced 45° apart from each other.

6. The fiber optic gyro of claim 2 which further comprises polarization means for linearly polarizing said light from said light source and for providing it to said optical coupling means, and wherein said optical coupling means is formed by polarization retaining optical transmission path means and said polarization retaining optical transmission path means and said polarization means are interconnected, with their principal axes displaced 45° apart from each other.

7. The fiber optic gyro of claim 2 which further comprises optical coupler means connected directly to said optical coupling means between said light source and said optical coupling means, for extracting said interference light which is output from said optical coupling means and for providing it to said photodetector.

* * * * *